Sept. 18, 1956
R. G. LE TOURNEAU
POWER OPERATED CABLE STEERING MEANS FOR A FOUR WHEEL DRIVEN TRACTOR
2,763,331
Filed Jan. 24, 1951
4 Sheets-Sheet 1
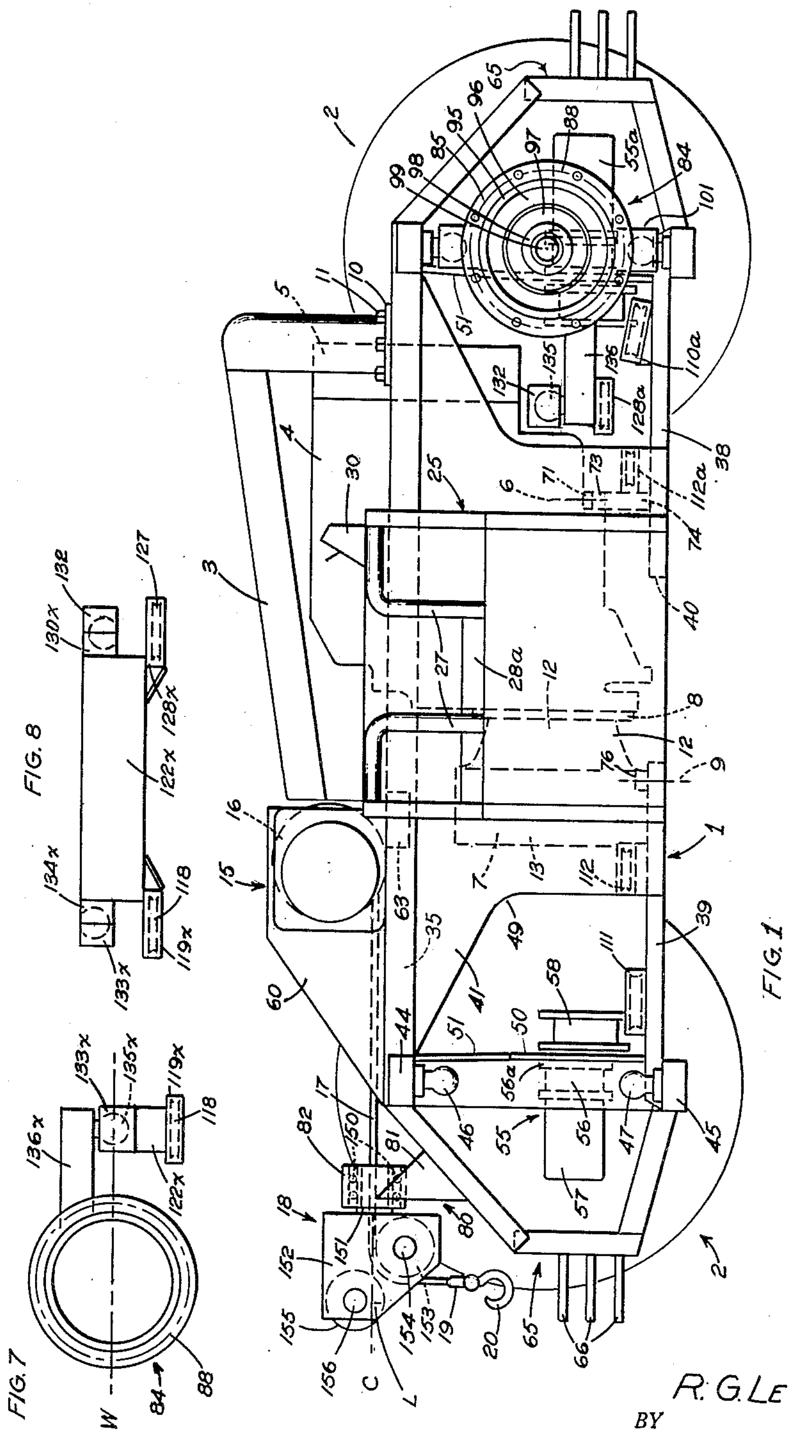
INVENTOR.
R. G. LeTOURNEAU
BY
F. D. Copeland Jr.
AGENT Sept. 18, 1956 R. G. LE TOURNEAU 2,763,331
POWER OPERATED CABLE STEERING MEANS FOR A FOUR WHEEL DRIVEN TRACTOR
Filed Jan. 24, 1951 4 Sheets-Sheet 2
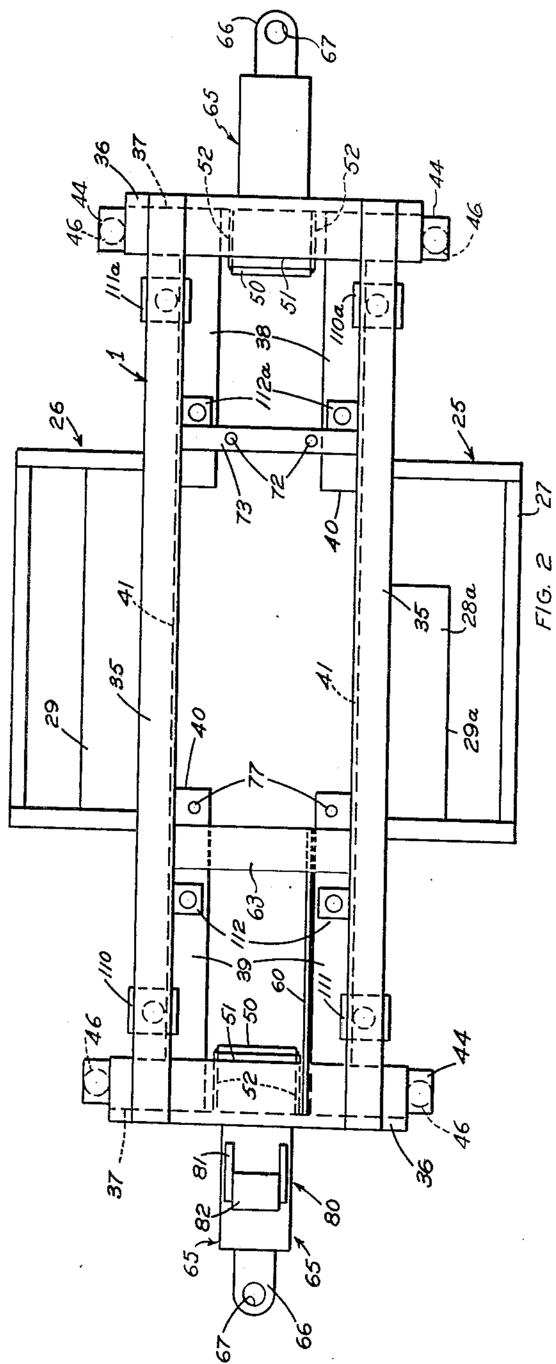
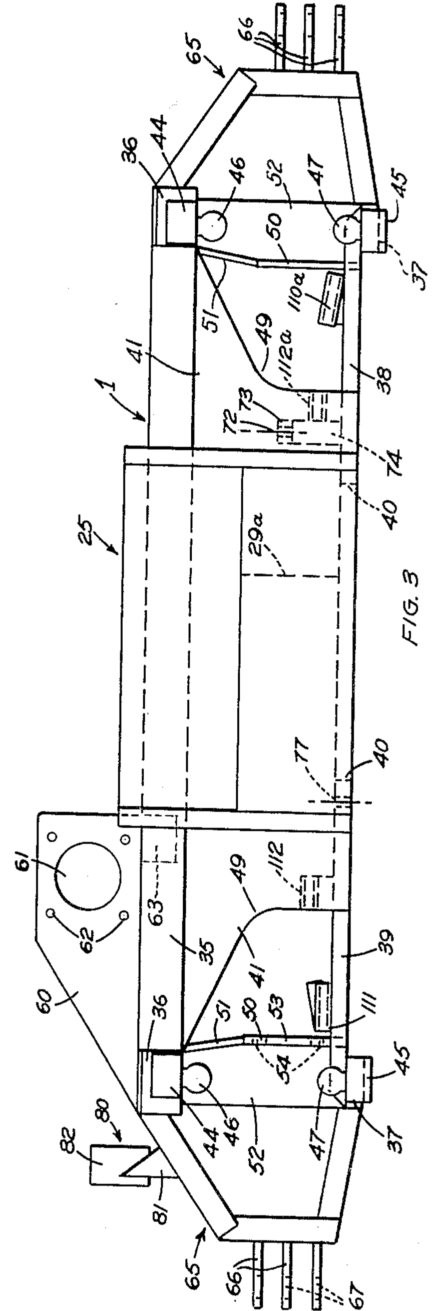
INVENTOR.
R. G. LeTourneau
BY
J. D. Copeland Jr.
AGENT Sept. 18, 1956 R. G. LE TOURNEAU 2,763,331
POWER OPERATED CABLE STEERING MEANS FOR A FOUR WHEEL DRIVEN TRACTOR
Filed Jan. 24, 1951 4 Sheets-Sheet 3
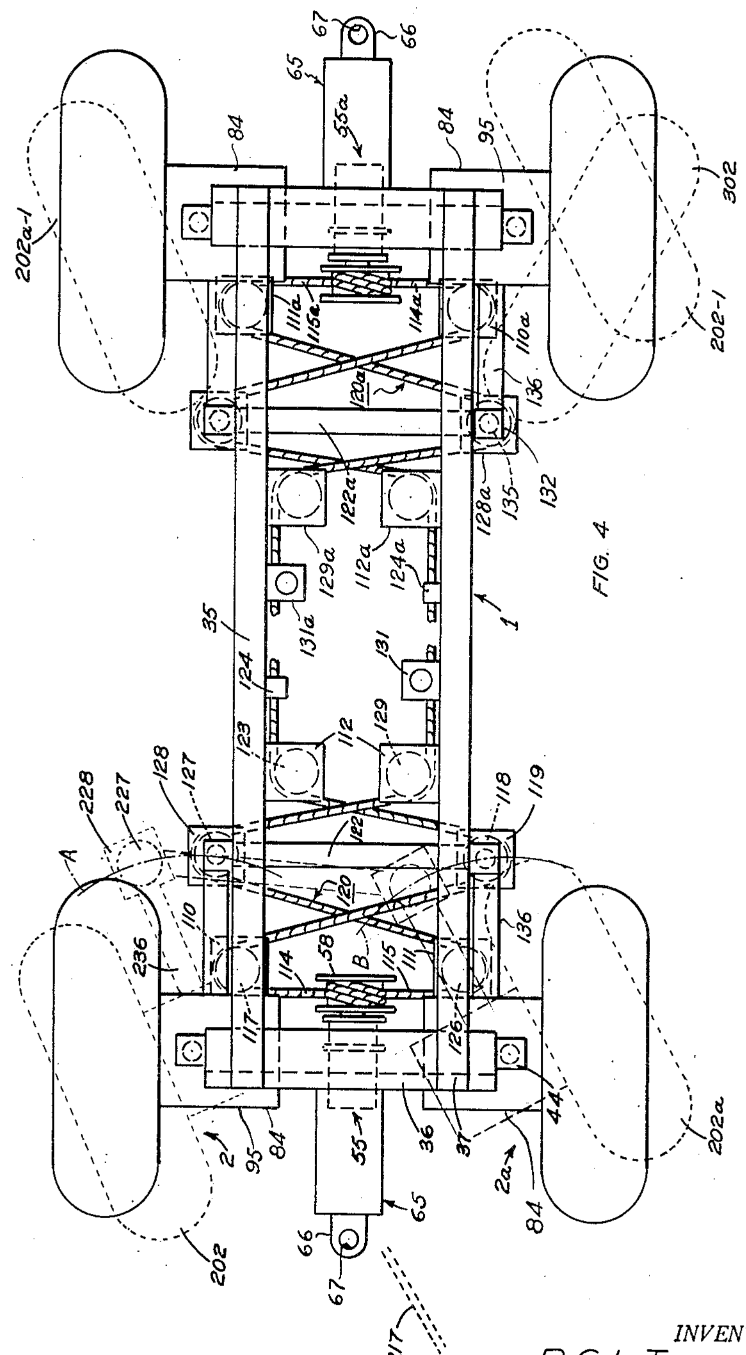
INVENTOR.
R. G. LeTOURNEAU
BY
F. D. Copeland Jr.
AGENT Sept. 18, 1956

R. G. LE TOURNEAU

POWER OPERATED CABLE STEERING MEANS FOR A FOUR WHEEL DRIVEN TRACTOR 2,763,331

Filed Jan. 24, 1951

INVENTOR.
R. G. LeTOURNEAU
BY
F. D. Copeland Jr.
AGENT

United States Patent Office 2,763,331

Patented Sept. 18, 1956

2,763,331

POWER OPERATED CABLE STEERING MEANS FOR A FOUR WHEEL DRIVEN TRACTOR

Robert G. Le Tourneau, Longview, Tex., assignor to R. G. Le Tourneau, Inc., Peoria, Ill., a corporation of California Application January 24, 1951, Serial No. 207,516

6 Claims. (Cl. 180—45)

This invention relates to a prime mover including four individually powered and steerable wheels.

The primary object of this invention is to provide a prime mover which will be especially adapted to towing and maneuvering heavy bulky mobile loads such as a large multi-engine aircraft.

A further object is to provide a tractor which includes a unique steering arrangement wherein the electric motor which powers the tractor wheels is an integral part of the steering system and acts as the wheel spindle itself and supports the knuckle joint link arm.

Yet another object of this invention is to provide a towing tractor which includes a unique fairlead unit whereby the towing cable always bears against the nearest sheave of the unit regardless of the angle assumed by the cable.

Another object of the invention is to provide a tractor having both rear wheel and front wheels independently steered and having separate power means for the steering of each set of wheels so that the rear wheels may turn in the same direction as the front wheels or in the opposite direction as desired.

A still further object is to provide a towing tractor wherein the front and rear wheels are independently steerable in pairs so that the tractive force of each wheel may be applied parallel to the line pull of the towing cable, and wherein the power is applied to the line of travel when the tractor is making a turn.

These and other objects will be accomplished by means of such structure and relative arrangement of parts as will appear by a perusal of the following specification and claims.

In the drawings:

Fig. 1 represents a side elevational view of the tractor of this invention in which the steering cables, one front wheel unit and one rear wheel group have been removed for clarity of illustration.

Fig. 2 is a top plan view of the main frame of the tractor of this invention in which all accessories and superstructure have been removed.

Fig. 3 is a side elevational view of the frame shown in Figure 2.

Fig. 4 is a partly diagrammatic plan view of the main frame and attached wheel groups showing the steering arrangement of this invention.

Figure 7 is a fragmentary side elevation of a modified form of the steering arrangement.

Figure 8 is a fragmentary rear view of a modified tie rod arrangement used with the modification of Figure 7.

Figure 5:
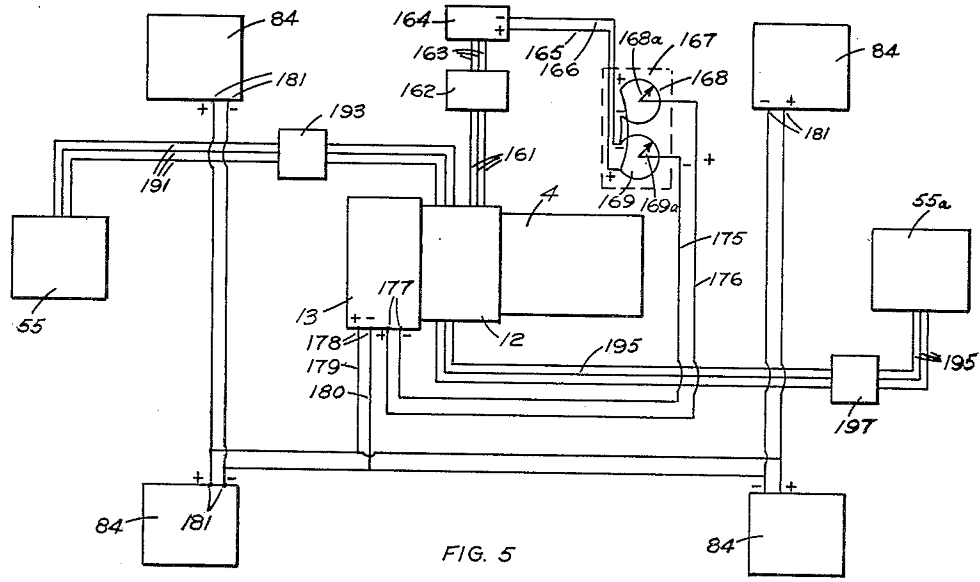
Fig. 5 is a schematic wiring diagram of the electrical circuits of this invention employed in driving and steering the tractor.

Referring now more particularly to the drawings, the main frame 1 of the tractor shown in Fig. 1 to be supported from the ground by wheel groups 2, and 2a. A hood 3 surrounds engine 4 and radiator 5 which are attached by bolts, represented by center line 6, to frame 1. Engine 4 is directly attached to generator 7 by way of bolt flange 8, and the generator and consequently the rear of engine 4 is supported from frame 1 by vertical bolts indicated by center line 9. The purpose of engine 4 is solely to drive generator 7, since the wheel drive, steering, and all functional operations of this machine are entirely electric. Generator 7 is actually a two unit machine including an A. C. generator unit 12, and a D. C. generator unit 13. The tractor also includes an electric winch indicated at 15 which includes a drum 16 to which tow cable 17 is anchored. Cable 17 threads thru fairlead assembly 18 and includes a ferrule 19 and a hook 20 at its free end. At each side of the tractor and projecting laterally therefrom are seat compartments 25 and 26, each are equipped with hand rails 27 seat cushions one only of which is shown labeled 28a. These cushions rest on built-in benches 29 and 29a the two compartments are similar except one, only, 25, includes an operator's control panel 30 and in this compartment the cushion 28a is shortened as is bench 29a to permit the tractor operator to face forward while any passengers in either compartment will of necessity face sidewise.

Figure 6:
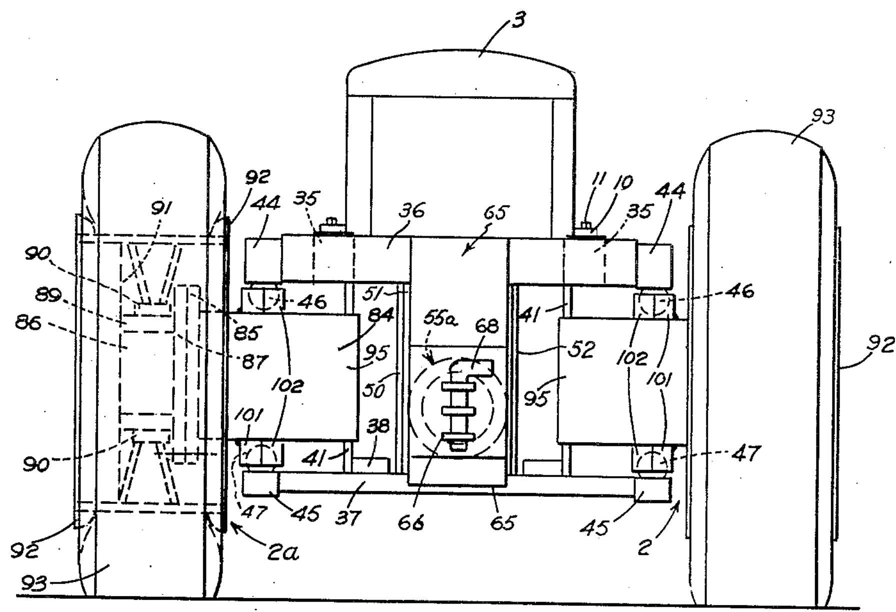
Fig. 6 is a front end view of the tractor of Fig. 1 showing the front wheel unit installed.

In Figs. 2 and 3 the structural details of the main frame 1 may be examined. This frame is made up of two spaced upper longitudinal beams 35 attached to and partially overlapping upper cross beams 36. Lower cross beams 37 are positioned directly under cross beams 36 and the lower beams are supported in part by overlapping floor beams 38 and 39. These floor beams do not extend the entire length of the frame but terminate as at 40 short of the midsection. A side plate 41 is welded to the underside of each top beam 35 and overlaps the outer side of floor beams 38 and 39 to which it is also welded. The outer extremities of both the upper and lower beams 36 and 37 are attached to ball blocks 44 and 45 which include, respectively, depending balls 46 and upstanding balls 47. Side plates 41 are cut away as at 49 to provide clearance for the steering arrangement as will be more fully described hereinafter. A motor mounting plate 50 is supported in space adjacent the front and rear of the main frame 1. A plate 51 is attached to each cross beam 36, and side plates 52 overlie beams 37. Plates 50 are welded to beams 36, plates 51 and 52 and beams 37. Plate 50 includes a large central opening 53 and spaced bolt holes 54 to permit steering winch 55 to be attached thereto by way of bolt flange 56a of its gearbox 56 (Fig. 1). A motor 57 and cable drum 58 complete the steering winch 55. In Fig. 3 the towing winch mounting plate 60 will be observed to include an opening 61 and bolt holes 62 of the same arrangement as plate 50. Mounting plate 60 overlies cross beam 36 at its rearmost end and cross member 63 at its forward end. Cross member 63 connects between the inner sides of plates 41 and also provides supporting means (not shown) for the rear end of hood 3. At the front and rear of main frame 1, a projecting hitch structure 65 is welded to cross beams 36 and 37. A series of vertically spaced horizontally projecting eyeplates 66 project from hitch structure 65. These eyeplates include aligned holes 67 to receive a hitch pin 68 as shown in Fig. 6.

The location of the engine and generator mounting means may be observed in Figs. 1, 2 and 3. The engine includes mounting pads 71 which align with tapped holes 72 of cross piece 73 so that when installed, capscrews indicated by center line 6 may engage pads 71 and cross piece 73. Cross piece 73 is raised and supported in the proper position by strut 74 which overlies front floor beams 38. Generator 7 includes laterally projecting mounting pads 76 which overlie and align with tapped holes 77 of rear floor beams 39 so that the generator and engine may be secured to the frame at this position by capscrews indicated by the center line 9 in Fig. 1. Hood 3 which partially covers engine 4 and generator 7 includes laterally extending mounting plates 10 which are secured by capscrews 11 to beams 35.

At the rear of frame 1 a fairlead support 80 is welded to rear hitch structure 65. This support includes triangular side plates 81 and a bearing block 82 supported between the side plates.

The wheel groups 2 and 2*a* of this invention include an electric motor 84 including a circular mounting flange 85 which attaches to a stationary wheel axle (Fig. 6) by way of a bolt flange 87 and bolt circle 88. Axle 86 is journalled thru bearings 89 to a wheel body 90 and the electric motor 84 drives the wheel body 90 thru driving connections (not shown) within a gear housing 91 beyond the axle. Details of construction of a wheel of this character may be found in my copending application No. 181,038 filed August 23, 1950, except that the motor and axle in this application are removably connected whereas in the earlier application they were welded together into one integral unit. Wheel body 90 includes end rims 92 which retain tire 93 therebetween. Motor 84 includes a housing 95 (Fig. 1), a stator 96, a rotor 97, a hollow rotor shaft 98, and a pinion shaft 99. The housing 95 includes socket halves 101 welded thereon (Fig. 6) and when the wheel groups 2, 2*a*, are installed between upper and lower balls 46 and 47, a removable socket half 102 is added to enclose each ball and thereby secure the ball and motor housing 95, and consequently wheel groups 2, 2*a*, in vertically fixed but horizontally turnable relation.

The steering arrangement of this invention may be observed by especial reference to Fig. 4 together with the other views. The floor beam 39 (Fig. 2) supports laterally aligned sheave housings 110 and 111 near each end of the frame 1. One sheave housing 111 lies flush with and is supported from floor beam 39 whereas the other laterally aligned housing 110 is tilted to provide, proper cable alignment with other sheave housings in the steering arrangement. A second pair of aligned sheave housings 112 are supported slightly above floor beam 39 and from side plates 41. Plates 50 each support a reversible electric winch 55, the drum 58 of which is operatively connected to two oppositely wound leads 114 and 115 of cable systems indicated generally at 120 and 120*a* which are employed to steer the rear and front wheels in pairs, respectively. Since the front and rear cable systems are virtually identical only the rear cable system 120 will be examined in detail. Cable lead 114 extends laterally out from drum 58 to and around sheave 117 of housing 110 and then transversely of the main frame to and around sheave 118 of housing 119 attached to link arm 136 and thence around direction changing sheave 123 of housing 112 and then to a fixed cable anchor 124. The oppositely extending lead 115 follows a similar pattern, passing first around sheave 126 of housing 111 and thence to and about sheave 127 of housing 128 fastened to link arm 136 of the other motor and then about direction changing sheave 129 of housing 112 and from there to an adjustable anchor 131 attached to the inner wall of side plate 41. The front cable system 120*a* is reeved between corresponding components to those of system 120, and performs its function in a similar manner. The elements of system 120*a* are numbered correspondingly to those of 120 but include the suffix "*a*." Tie rods 122 and 122*a* are pivoted at each end to a ball 135 which is fixed to the end of link arm 136 which is fixed relative to motor housing 95. While the steering arrangement as described has been very satisfactory in actual operation, a tie rod such as shown in Figs. 7 and 8 as 122X is a preferred form from a maintenance standpoint. This tie rod 122X includes integral socket halves 130X and 134X at its ends, which are bolted to removable socket halves 132 and 133X when the respective halves surround ball 135. Sheave housings 119X and 128X are in this embodiment welded to the underside, and sheaves 118 and 127 are included in these sheave housings respectively. When the tie rod 122X is employed in the steering system it is connected to one wheel in a manner similar to that shown in Fig. 1, however the other wheel of the pair would be connected as shown in Fig. 7. In this view the link arm 136X projects from motor 84 at a point above the wheel center line W, and ball 135X depends therefrom in such a manner that its center lies in center line W. Hence the center of both balls 135X and 135 are coincident with the center of the wheel groups, so that tie rod 122X attached to ball 135X by socket halves 133X and 134X and attached to ball 135 by socket halves 130X and 132 is parallel to the ground even tho link arms 136 and 136X are at different vertical heights. The advantage here from the maintenance standpoint is that the same motor 84 may be used interchangeably in all four wheel positions, since the sheave housings 119X and 128X are carried on the tie rod 122X and their position is not effected by switching the motor from one side to the other, as they were where the housing was attached to the link arm itself.

The operation of the steering arrangement may be observed with reference to the phantom outlines in Fig. 4. When winch 55 is operated in one direction, for instance clockwise when facing the drum end of the winch, lead 114 is reeled in while lead 115 pays out. This action causes sheave 118 and consequently its housing 119 and tie rod 122 to move to the vehicle left when this happens arms 136, sheave housing 128 and sheave 127 will assume the positions shown at 236, 228, and 227 and the rear wheel groups 2 and 2*a* will be turned as shown in phantom outline 202 and 202*a*. At the same time, if winch 55*a* is rotated clockwise, lead 114*a* will be reeled in, and the front wheel groups will assume positions shown outlines 202–1 and 202*a*–1 by the same action as described for cable system 120. When the wheels are in this position, the tractor can exert a pulling force parallel to the line pull of tow cable 17 when the latter is in an angular position such as that shown in outline 217. Steering of the tractor may be accomplished by operation of either the front winch 55*a* or the rear winch 55 separately or the operation of both at the same time, one in a clockwise direction as outlined above and the other in a counter-clockwise direction. When this occurs the front wheel groups will assume a direction indicated at 302 and the rear wheel groups as described and indicated at 202 and 202*a*. In these positions, steering will be exceedingly sharp and each wheel group will be applying its driving force in the direction it is turning so that there is no lost power on a turn as occurs in many conventional tractors.

It is to be noted that the arrangement of steering elements is such that the inner wheel in a turn will turn more than the outer wheel. This is true because of the relative locations of the pivot points of tie rods 122 and 122*a* (Figure 4) with respect to the center of balls 47 about which the wheels turn. Consider, e. g., the tie bar 122 which is pivoted to wheel link arms 136 by balls 135. As the tie rod is moved to turn the wheels to the position indicated by dotted lines at 202 and 202*a*, link arms 136 move their outer ends along arcs A and B. The pivot point locations are such that wheel 202*a* moves through a greater angle than does wheel 202.

In addition to the physical steering arrangement, the schematic wiring diagram of Fig. 5 shows the means employed to permit differential action in the wheels even tho they are each individually powered by separate electric motors. Engine 4 drives generators 12 and 13 which produce electric power for operation of the machine and controls. A. C. generator 12 supplies three-phase E. M. F. thru leads 161 to transformer 162, and leads 163 direct the transformed E. M. F to rectifier 164. D. C. potential is introduced thru leads 165 and 166 to a reversing potentiometer 167 which includes a pair of circular rheostats 168 and 169 from which the controlled E. M. F. is directed thru leads 175 and 176 to the field terminals 177 of D. C. generator 13. The output E. M. F. of generator 13 is carried from terminals 178 by leads 179 and 180 to armature terminals 181 of wheel drive motors 84. Wiper arms 168*a* and 169*a* deliver E. M. F. of one polarity to field terminals 177 until they pass the midpoint of circular rheostats 168 and 169, after which their polarity reverses and the polarity of the generator field represented by terminals 177 reverses and the output E. M. F. thru terminals 178 has a reverse polarity so that motors 84 will accordingly reverse.

A potentiometer suitable for this installation is described in more detail in my copending joint application with Charles C. Roe, Serial No. 111,658 filed August 24, 1949, entitled Electric Bulldozing Tractor, now Patent No. 2,698,919.

The motors 84 have series wound armatures and may each turn or be turned at a separate rate of speed and will each receive E. M. F. in proportion to their demand. Consequently when the tractor is making a turn the outside motor may go faster as it has a further distance to travel, and yet each motor receives E. M. F. so that it may continue driving the tractor even on turns.

The actual steering is accomplished by A. C. motors 55 and 55*a* as earlier described. Rear steering winch 55 is connected by leads 191 to a reversing relay 193 and is operated by a switch (not shown) on a control panel 30. Front steering winch 55*a* is similarly connected by means of leads 195 and relay 197. Winch 55 and winch 55*a* may be operated simultaneously or separately to provide steering or sideways travel.

The fairlead assembly 18 may be observed by reference to Fig. 1. The complete assembly includes support 80 previously shown to include side plates 81 and a bearing block 82. Block 82 includes a bearing 150 thru which is journalled a hollow shaft 151 integrally connected to fairlead housing 152. Inner sheave 153 is journalled to pin 154 so located that sheave 153 will be tangent to center line C. An outer sheave 155 is journalled about pin 156 which is spaced to the rear of pin 154 in a longitudinal direction. Pin 156 is further located so that the circumference of sheave 155 extends beyond the cable center line C and overlaps the said line. It will be observed that the amount of this overlap as represented by the distance L, which will provide a lever arm when cable 17 is about sheave 155 so that a pull exerted on cable 17 in this position will also apply a force on this lever arm and cause fairlead housing 152 to turn in bearing 150 until the cable 17 wraps around sheave 153 which is its normal working position. This fairlead assembly has two unique and useful functions in that the cable will always lay about the sheave nearest the support 80, and the use of longitudinally spaced sheaves will permit a relatively wide space between the sheaves 153 and 155 so that the cable threaded thru block 82 and between the sheaves may include a ferrule or cable clamp (19) already attached. In conventional fairlead the distance between the sheaves is so close that only a bare cable my be inserted.

From the foregoing description it will be readily seen that I have produced such a device as substantially fulfills the objects of the invention as set forth herein.

While this specification sets forth in detail the present and preferred construction of this bulldozing tractor, still in practice such deviations from such detail may be resorted to as do not form a departure from the spirit of the invention, as defined in the appended claims.

Having thus described my invention, what I claim as new and useful and desire to secure by Letters Patent is:

1. A tractor frame comprising spaced longitudinal top beams, side plates attached to the top beams and depending therefrom, floor beams attached to the side plates, upper and lower crossbeams attached to each end of said top and floor beams, a depending ball at the outer end of each upper crossbeam, and an upstanding ball at the outer end of each lower crossbeam, said side plates being cut away adjacent said balls, said balls being adapted to be received in sockets of wheel supporting members.

2. A tractor comprising a main frame, vertically spaced ball joints supported by said frame at the lateral edges thereof, wheel groups between said ball joints and pivotally attached thereto for movement in a horizontal plane, said wheel groups each including a wheel unit and a power unit attached thereto, said power unit comprising an electric motor having a housing, diametrically opposed sockets on each said housing surrounding said corresponding ball joints, a link arm rigidly secured to and projecting laterally from each of said housings, a sheave at the distal end of each said link arm, and a power operated cable system associated with each pair of said wheel groups and having each of its ends secured to said frame and operatively connected to said sheaves to impart steering movement to said wheels.

3. A tractor comprising a main frame, vertically spaced ball joints supported by said frame adjacent each corner thereof and spaced laterally outward therefrom, a pair of wheel groups, one of said wheel groups being positioned between each pair of vertically spaced ball joints and pivotally connected thereto for movement in a horizontal plane, said wheel groups each including a wheel unit and a power unit attached thereto, each said power unit comprising an electric motor having a housing, said pivotal connection including diametrically opposed sockets on said housing surrounding said corresponding ball joints, a link arm rigidly secured to and projecting from each said housing, a ball joint on said link arm, a tie-rod connecting said link arms of each pair of wheel groups by means of said last mentioned ball joints, sheaves carried by said tie rods, other sheaves attached to said main frame and rotatable about a fixed axis, a separate reversible electric winch supported from said frame at each end, each pair of wheel groups at each end of the frame having a separate cable control system with the free ends of each cable secured to the frame and reeved between said tie rod mounted sheaves and said frame mounted sheaves and operatively attached to one of said electric winches for steering said wheel groups.

4. In a power operated steering system for use on a tractor including a frame, a pair of wheel groups for supporting one end of the tractor, each wheel group being pivoted to said frame for steering movement in a horizontal plane, a laterally projecting link arm rigidly secured to each of the wheel groups, a tie rod, means pivotally connecting the ends of said tie rod to the free ends of said link arms; an electric winch on said frame, sheaves on said frame and mounted for rotation about fixed axes thereon, sheaves carried by said tie rod and rotatable about corresponding fixed axes thereon, and a cable system operatively connected between said winch and both named sheaves and having the free ends of the cable fixedly secured to the frame.

5. In a steering system for use on a tractor including a frame, a pair of wheel groups for supporting one end of the tractor, each wheel group being pivoted to said frame, each wheel group comprising a wheel unit and a power unit attached thereto, said power unit comprising an electric motor having a housing, a first link arm rigidly secured to and projecting from the housing of one wheel group at a point below the center of said housing, a second link arm rigidly secured to and projecting from the housing of the other wheel group at a point above the center of the housing of said other wheel group, an upstanding ball joint secured to the free end of said first link arm, a depending ball joint secured to the free end of said second link arm and a tie rod including a downwardly opening socket at one end and upwardly opening sockets at the other end, the center of said socket lying in a common horizontal plane and parallel to the central horizontal plane of the tie rod, said downwardly opening socket enclosing said upstanding ball joint and said upwardly opening socket enclosing the said depending ball joint, the centers of said ball joints lying in a common horizontal plane whereby said ball joints are arranged to position said tie rod substantially horizontal.

6. A steering system as in claim 5 characterized by a power winch mounted on said tractor frame, stationary sheaves rotatably mounted on said frame about a fixed axis, sheaves carried by and movable with said tie rod, and a cable system having its ends fixed to the frame reeved between said frame mounted sheaves and said tie-rod carried sheaves and operatively attached to said winch whereby steering movement is imparted to said wheel groups in the same direction simultaneously.

References Cited in the file of this patent

UNITED STATES PATENTS

| | | |
|---|---|---|
| 630,054 | Heymann | Aug. 1, 1899 |

| | | |
|---|---|---|
| 859,235 | Macfarren | July 9, 1907 |
| 867,282 | Macfarren | Oct. 1, 1907 |
| 888,589 | Cooper | May 26, 1908 |
| 1,083,681 | Harris | Jan. 6, 1914 |
| 1,745,598 | Brinton | Feb. 4, 1930 |
| 1,840,115 | Lee | Jan. 5, 1932 |
| 2,059,974 | Smith | Nov. 3, 1936 |
| 2,258,328 | Lee et al. | Oct. 7, 1941 |
| 2,316,521 | Lee | Apr. 13, 1943 |
| 2,334,702 | Newton et al. | Nov. 23, 1943 |
| 2,358,236 | Lee | Sept. 12, 1944 |
| 2,571,180 | Ball et al. | Oct. 16, 1951 |

FOREIGN PATENTS

| | | |
|---|---|---|
| 84,799 | Germany | July 11, 1895 |
| 96,802 | Switzerland | Nov. 16, 1922 |